S. JESSEN.
IMPLEMENT FOR CLEANING OUT MEADOWS AND PASTURE FIELDS.
APPLICATION FILED JAN. 16, 1909.
968,058.
Patented Aug. 23, 1910.
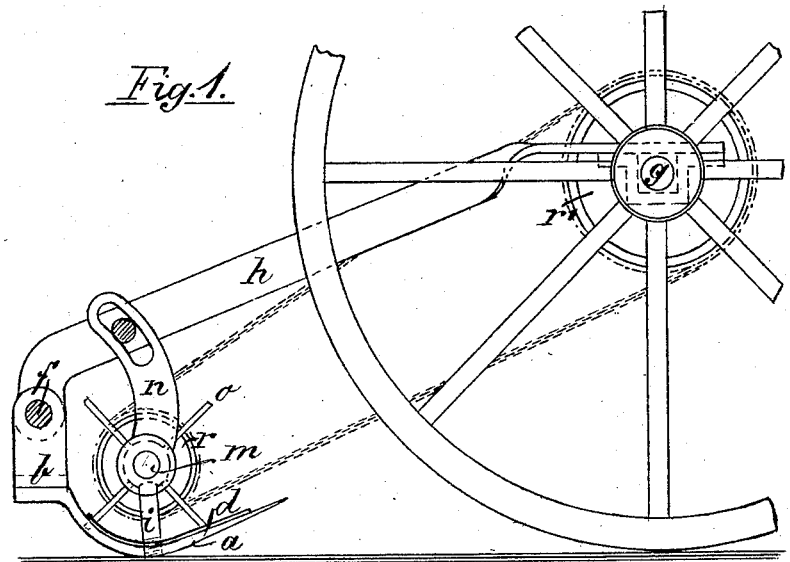
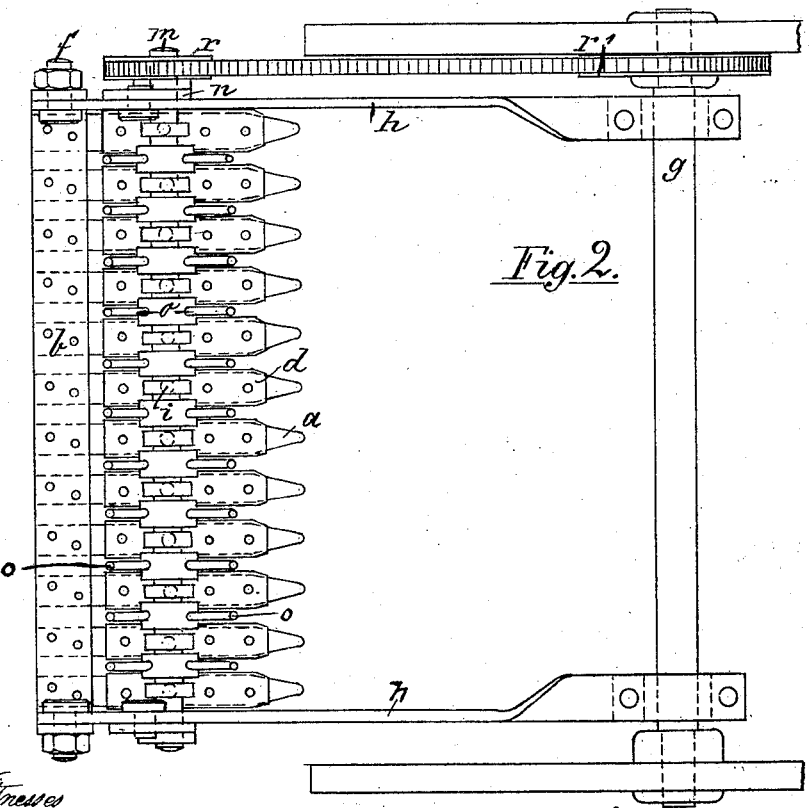

UNITED STATES PATENT OFFICE.

SOPHUS JESSEN, OF NEUMÜNSTER, GERMANY.

IMPLEMENT FOR CLEANING OUT MEADOWS AND PASTURE-FIELDS.

968,058.  Specification of Letters Patent.  Patented Aug. 23, 1910.

Application filed January 16, 1909. Serial No. 472,753.

*To all whom it may concern:*

Be it known that I, SOPHUS JESSEN, a subject of the Emperor of Germany, residing at Neumünster, Germany, have invented certain new and useful Improvements in Implements for Cleaning Out Meadows and Pasture-Fields, of which the following is a full, clear, and exact specification.

The present invention relates to an implement which is adapted to cut away all the weeds which are higher and thicker than the grass, such as thistles, broom straw, etc., while the lower and more flexible grass is not touched by the knives. To this end a curved bar composed of a number of knives with sharpened lateral edges is drawn over the field to be cleaned and rods radially projecting from a shaft pass through the open spaces between the knife blades so that the flexible grass can pass through uncut, while the stiffer plants are jammed in between the knives and cut away.

In the accompanying drawing: Figure 1 is a side elevation of the new implement, and Fig. 2 is a plan view thereof.

A plurality of curved shoes $a$ with points in front and extending in the direction of the motion of the implement are secured with their rear ends to a cross bar $b$ which is pivotally connected to the side bars $h$ of the frame at $f$. The concave upper surface of each shoe $a$ is provided with a steel plate $d$ having the lateral edges sharpened like knives and leaving between the sharp edges free spaces. Straps $i$ are used as a further means of suspension of the curved knife bars, being secured to a cross-shaft $m$ provided with slotted hangers $n$ so that the shaft can be adjusted in position on the side arms $h$ of the frame by jam nuts and the like in a suitable manner. The shaft $m$ carries a number of short sleeves with radially projecting rods $o$ adapted to enter the spaces between the knife blades when the shaft revolves. Motion is transferred to it by means of a driving chain passing over a chain wheel $r$ on the shaft $m$ and a wheel $r'$ secured to the driving axle $g$, carrying the driving wheels.

It will be easily understood how the points of the shoes $a$ can be adjusted higher or lower according to the nature of the field by adjusting the slotted hangers $n$ on the frame $h$.

Having thus described my invention, what I claim is:

1. Implement for cleaning out meadows and pasture fields comprising an adjustable bar having knife blades and fingers, spaces between the blades in combination with a shaft provided with means to revolve it and with rods radially projecting from said shaft and adapted to travel through the spaces between the individual knife blades substantially as described.

2. Implement for cleaning out meadows and pasture fields comprising an adjustable bar having knife blades and fingers arranged with spaces between them in combination with a shaft provided with means to revolve it, and with rods radially projecting from said shaft and adapted to travel through the spaces between the individual knife blades substantially as described.

3. In implements for cleaning out meadows and pasture fields the combination of an axle with driving wheels, side bars extending rearwardly, a shaft adjustably suspended from the side bars carrying radially projecting rods and provided with a chain wheel and a chain as driving means, a bar pivotally connected to the rear ends of the side bars, said bar having a plurality of shoes with knife blades having sharpened edges and spaces between them for the passage of the rods on the shaft when said shaft is revolved substantially as described.

In testimony whereof I affix my signature.

SOPHUS JESSEN.

In the presence of—
  JULIUS RÖPKE,
  GUSTAV HERMES.